Feb. 24, 1970 P. P. MORISON 3,496,907
OILING OF DOUGH PIECES
Filed April 5, 1966 4 Sheets-Sheet 4
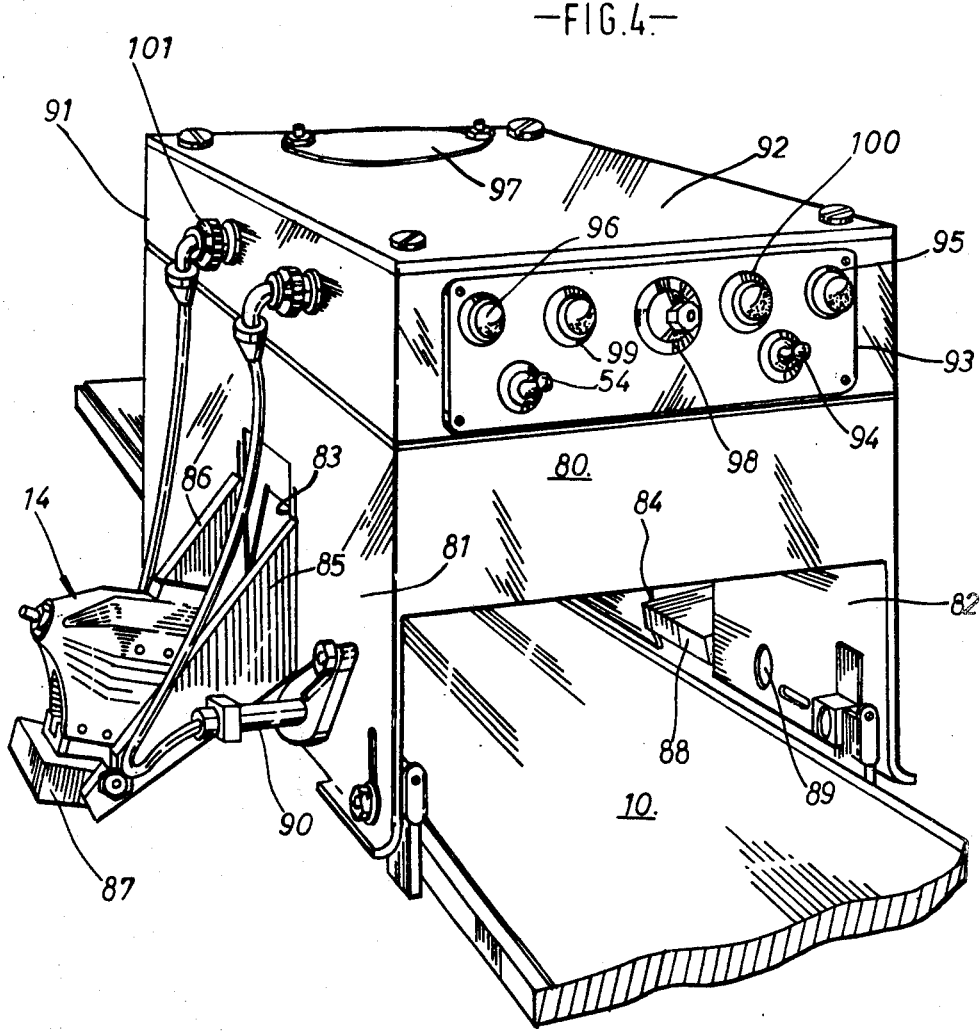
INVENTOR:
PETER P. MORISON
BY
Browne, Schuyler + Beveridge
ATTORNEYS

United States Patent Office 3,496,907
Patented Feb. 24, 1970

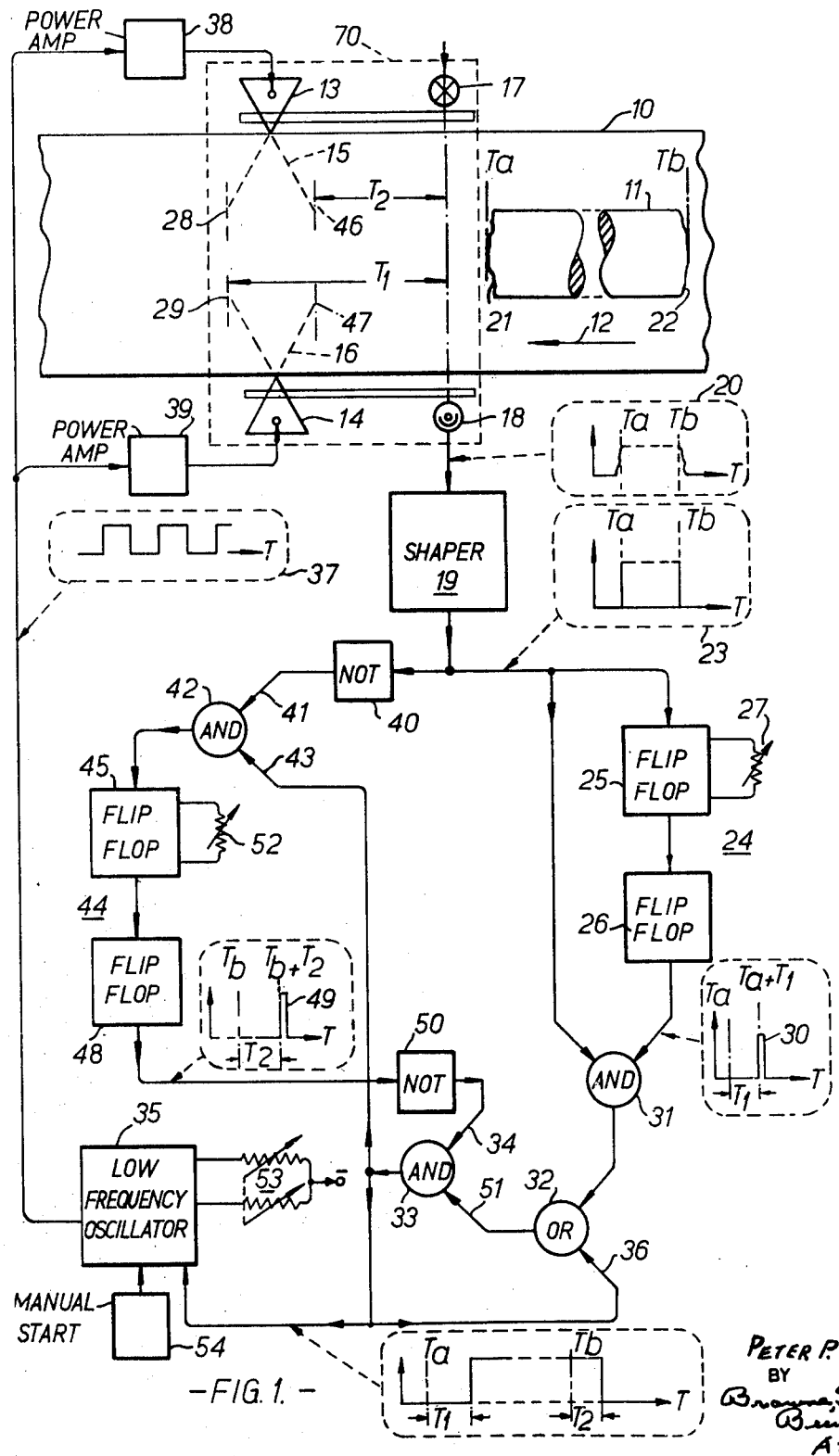
- FIG. 1. -
INVENTOR:
PETER P. MORISON
BY
ATTORNEYS

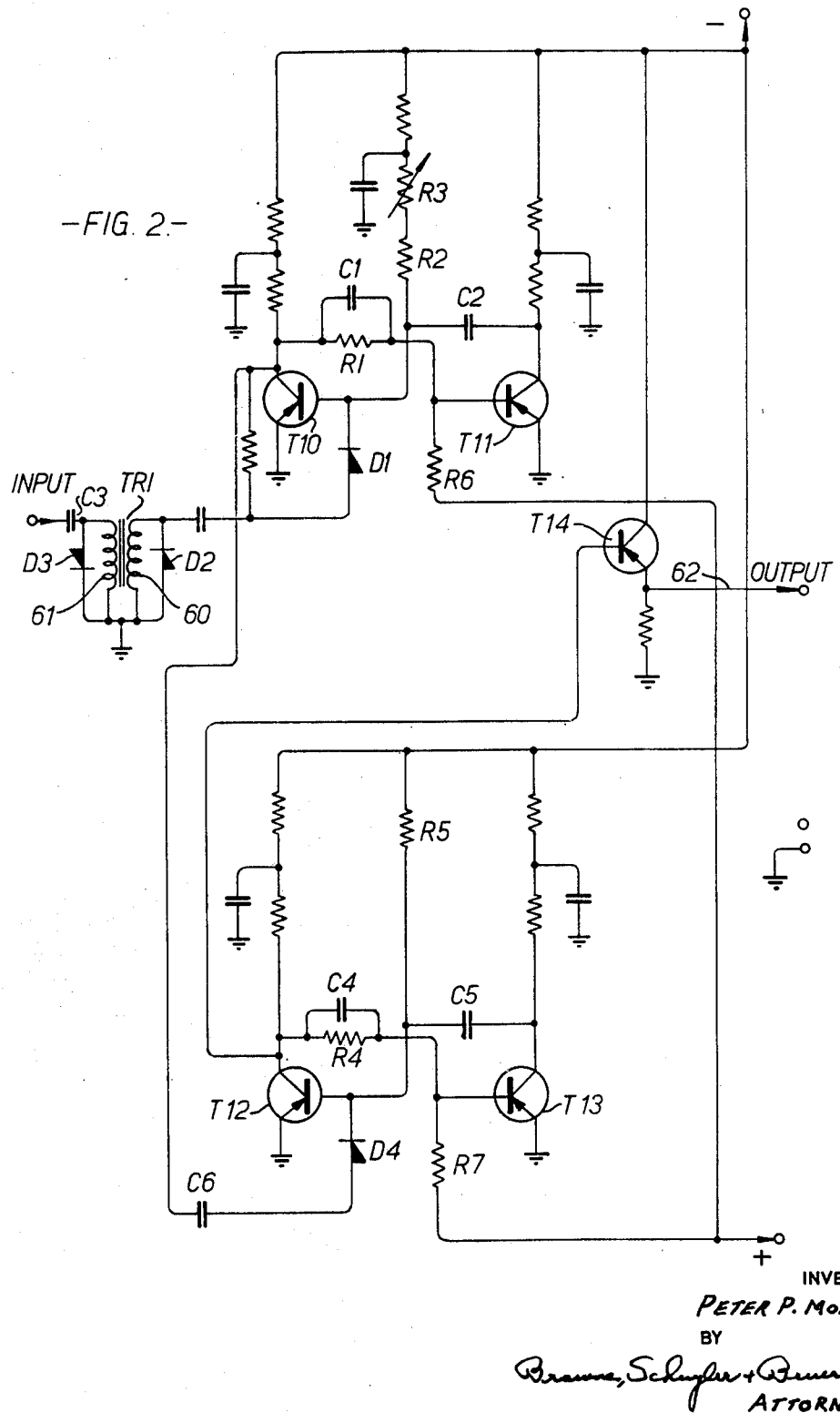

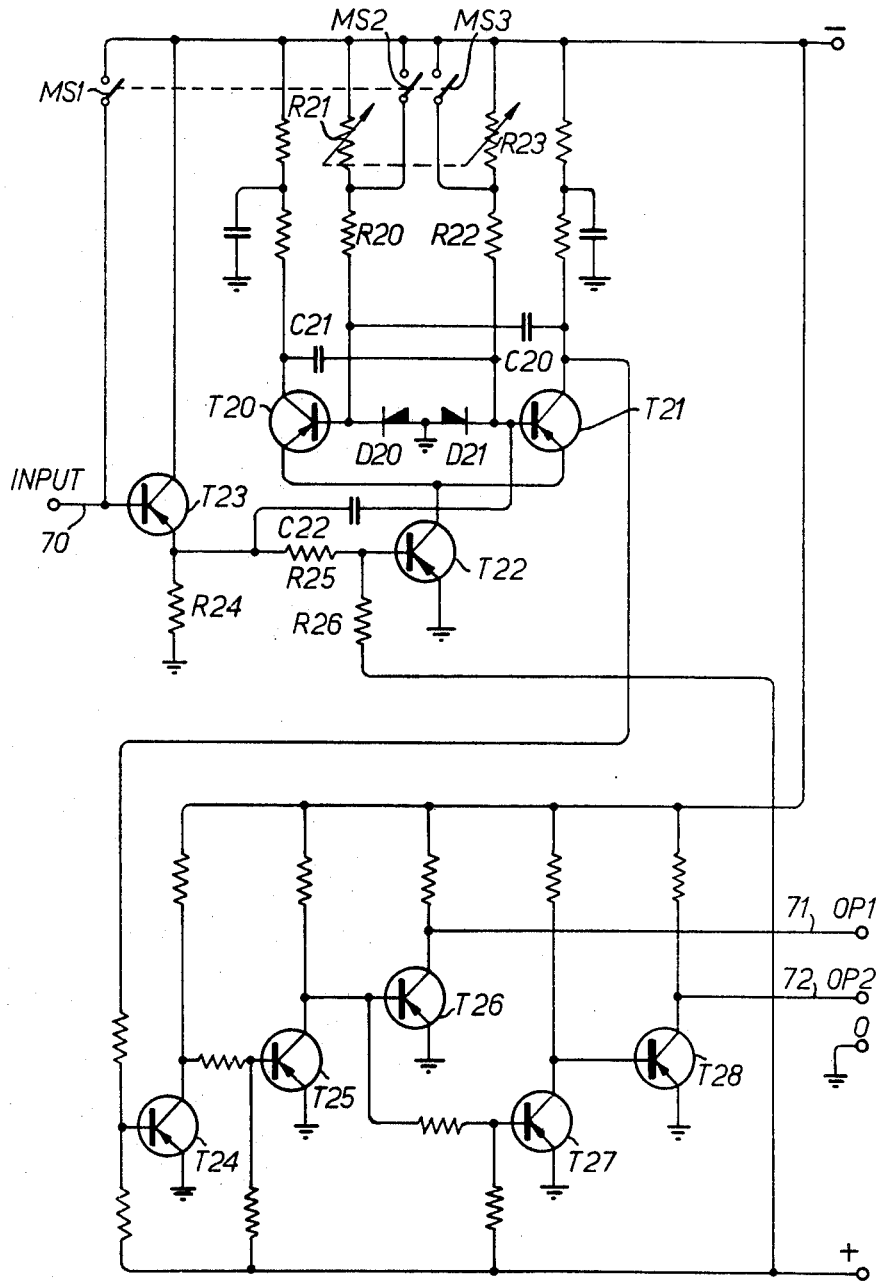
−FIG. 3.−

3,496,907
OILING OF DOUGH PIECES
Peter Philip Morison, Cambridge, England, assignor to Spillers Limited, London, England
Filed Apr. 5, 1966, Ser. No. 540,374
Claims priority, application Great Britain, Apr. 7, 1965, 14,680/65
Int. Cl. B05c 5/02
U.S. Cl. 118—2       14 Claims

ABSTRACT OF THE DISCLOSURE

Apparatus for applying small quantities of oil to dough pieces using airless spray guns with electromagnetically operated pump units driven by a sub-mains frequency oscillator. Oscillator start and stop signals are derived from detection of leading and trailing edges of dough pieces and applied to different time delay circuits to control the discharge of the spray guns.

---

The present invention relates to apparatus for oiling dough pieces.

In the baking industry it is common practice to utilize an oil to facilitate the release of loaves and the like from a tin or other container in which they have been baked. Such oil may be applied either to the baking tin or other container or to the dough piece, and in many instances it is preferable to apply the oil to the dough piece. For satisfactory release of a loaf a remarkably small quantity of oil is required. As an example, less than 0.01 oz. of oil applied to a nominal 1 lb. dough piece is sufficient. It is current practice to apply oil to a dough piece just before tinning and in large bake-houses the dough pieces are conveyed to a tinning station on a moving conveyor. It is, therefore, most convenient to apply the oil to dough pieces whilst travelling on that conveyor. Hitherto it has been customary to use an air-operated spray gun for this purpose. A disadvantage with such a spray gun is that it utilizes a jet of air to propel the oil which becomes atomized and a fog is created, making it difficult to direct the oil solely where it is required, namely on a dough piece. In many instances a form of tunnel is provided through which the conveyor passes and attempts are made to contain the fog, as far as possible, within the tunnel.

We have now found that more satisfactory application of oil to a dough piece can be obtained by using an airless spray unit for directing the oil to a dough piece. Such a spray unit embodies a pump which receives oil from a supply chamber and propels it through a suitable atomizing nozzle. One particularly suitable form of airless spray unit for this purpose is that known as "Mistral C," which embodies an electro-mechanically operated pump unit normally intended for connection to the electric supply means.

One of the difficulties experienced with a conventional air-operated spray gun is that such a gun normally discharges oil at a rate greatly in excess of the small quantity required for satisfactory release of a dough piece, with the result that considerable oil is wasted and the presence of the fog created by such a spray gun results in the deposition of oil on the conveyor and surrounding parts which does not make for satisfactory cleanliness and hygiene.

Whilst in the preferred form of airless spray unit the pump is actuated by the armature of an electromagnetic solenoid assembly and some measure of control of the rate of discharge of oil can be obtained by limiting the amplitude of travel of such armature, we have found, according to the present invention, that a more extensive control of the rate of discharge can be obtained by varying the frequency of an electricity supply fed to the solenoid coil.

Thus according to one feature of the present invention apparatus for applying oil to dough pieces moving along a given path comprises at least one airless spray gun having an electromagnetically operated pump unit, and a variable frequency low frequency oscillator having a frequency below that of the electricity supply mains for providing energization of the pump unit.

With a view to obtaining sufficiently even distribution of oil on moving dough pieces, it is preferable to provide two spray guns, one on either side of and both a little above the given path, which is preferably provided by a conveyor.

We have found that a frequency approximately in the range of from two to ten cycles per second is suitable for driving a pair of airless spray guns disposed on opposite sides of a conveyor to cause them to supply the quantity of oil required. As low frequency oscillator, an astable multi-vibrator may conveniently be used and the necessary power to operate the spray guns derived through suitable power amplifiers.

With a view to avoiding unnecessary discharge of oil, control means are preferably provided responsive to the passage of dough pieces on the conveyor. Such control means preferably includes sensing means responsive to the presence of a dough piece at a sensing station in advance of the position of the spray guns along the conveyor and arranged to provide a first signal when the leading edge of a dough piece arrives at the sensing station and a second signal when the trailing edge of a dough piece leaves it. The control means also preferably include a first delay unit responsive to the first signal from the sensing means and arranged to provide a starting signal for actuation of the spray guns after a predetermined time delay such that the leading edge of the dough piece concerned has reached approximately the far edges of the spray cones from the spray guns, and a second delay unit responsive to a second signal from the sensing means and arranged to provide a stopping signal after a second predetermined time delay such that the trailing edge of a dough piece has reached approximately the near edges of the spray cones of the spray guns. In this manner the spray guns are effectively only actuated when part of a dough piece lies within their spray cones so that substantially all the oil discharged by the spray guns will fall on a dough piece.

The sensing means may conveniently comprise a light source and a photo-sensitive element such as photoelectric cell from which signals are applied to a shaper for providing a substantially square wave signal. The first delay unit is preferably in the form of a monostable multi-vibrator which is triggered by the leading edge of the output signal from the shaper. This monostable multi-vibrator resets after an adjustable time delay, which corresponds to the first time delay, and on resetting, triggers a second monostable multi-vibrator to provide an output pulse of predetermined width which is combined in a first AND-gate with the output signal from the shaper to pass a signal through an OR-gate to a second AND-gate which has been preconditioned to pass a signal. An output signal from the second AND-gate is applied to a low frequency oscillator in the form of an astable multi-vibrator producing square wave output signals and also provides a signal through the OR-gate to maintain this second AND-gate open. Square wave signals from the low frequency oscillator are fed through power amplifier stages to the two spray guns on opposite sides of the conveyor.

The second delay unit is preferably also in the form of a third monostable multi-vibrator having an adjustable reset time which corresponds to the second time delay. The second AND-gate provides a conditioning signal to a third AND-gate. The trailing edge of a signal from which the shaper is inverted and applied through a third AND-gate, which is conditioned by a signal from the second AND-gate, to trigger the third monostable multi-vibrator which, after the second time delay, resets, and on resetting, triggers a fourth monostable multi-vibrator to provide an output pulse of predetermined width which is inverted and applied to the second AND-gate to close it, the absence of such output pulse having previously preconditioned the second AND-gate to pass a signal from the OR-gate. The closing of the second AND-gate discontinues the signal to the low frequency generator and the spray guns are stopped.

The invention will be further described by way of example with reference to the accompanying drawings, in which:

FIG. 1 is a block schematic diagram of a preferred embodiment of the invention;

FIG. 2 is a circuit diagram of one form of delay unit suitable for use in the embodiment of FIG. 1;

FIG. 3 is a circuit diagram of one form of low frequency oscillator suitable for use in the embodiment of FIG. 1, and FIG. 4 is a perspective view of part of one embodiment of the invention.

Referring initially to FIG. 1, 10 represents a run of an endless conveyor for conveying dough pieces. An arbitrarily shaped dough piece is illustrated at 11 and the direction of travel of the conveyor 10 is from right to left, as seen in FIG. 1, as indicated by the arrow 12. Disposed on either side and somewhat above the conveyor 10 are a pair of spray guns 13, 14. Each of these spray guns is an airless spray gun and preferably of the type known by the trade name "Mistral C" marketed by Mistral Spray Guns Limited, London. Each of these spray guns is adapted to discharge a spray of oil in the form of a cone, as indicated diagrammatically at 15, 16. In advance of the spray guns 13, 14, in the direction of travel of the conveyor 10, is an exciter lamp 17 directing a beam of light across the conveyor to a photocell 18. Output signals from the photocell are applied to a shaper 19 which delivers a square output signal when the photocell 18 is obscured. A possible form of signal from the photocell 18 is indicated diagrammatically on a time scale at 20 and in this and other wave forms $Ta$ and $Tb$ respectively represent respectively the points on the time scale at which the leading edge 21 and the trailing edge 22 of a dough piece pass through the beam of light from the exciter lamp 17 to the photocell 18. The wave form of signals from the shaper 19 is illustrated diagrammatically at 23.

Since a photocell 18 is used for the purpose of detecting the passage of a dough piece it is desirable to avoid extraneous light falling on it and to inteference with the beam of light directed on to it by the lamp 17. This can conveniently be effected by providing a tunnel, which is shown only in outline in broken lines at 80, straddling the conveyor 10. Such tunnel also serves as support for the lamp 17 and photocell 18 and also for the spray guns 13, 14; the lamp 17 and the photocell 18 are adjustable in position at least vertically so that dough pieces of different heights can be accommodated, and similarly the spray guns 13, 14 are adjustable in position vertically and they are also adjustable angularly about horizontal axes so that the centre lines of their spray cones 15, 16 may be substantially horizontal or inclined upwardly or downwardly at an angle of up to about 45° to the horizontal.

The time interval $Ta$ to $Tb$ corresponds to the time taken for a dough piece to pass between the exciter lamp and photocell and for a given speed of the conveyor 10 will be dependent upon the length of a dough piece. The output signal from the shaper 19 is applied to a first delay unit 24 which is in the form of a pair of serially-connected monostable multi-vibrators 25, 26. The leading edge of the output signal triggers the first monostable multi-vibrator 25 which is adjusted by means of a variable resistor 26 to provide a predetermined delay denoted by the symbol T1. This time delay T1 corresponds to the time taken for the leading edge 21 of a dough piece to be moved by the conveyor from the line between the exciter lamp 17 and the photocell 18 and the trailing edges 28, 29 of the spray cones 15, 16 of the spray guns 13, 14. After the time interval T1, the first monostable multi-vibrator 25 resets and triggers the second monostable multi-vibrator 26, which provides an output pulse 30 of predetermined width. This pulse is applied to a first AND-gate 31 to which is also applied the output signal from the shaper 19. Provided that an output signal is still present when the pulse 30 reaches the AND-gate 31, it will pass therethrough and through OR-gate 32 to one input 51 of a second AND-gate 33. As will be hereinafter described this second AND-gate 33 is normally preconditioned by its second input 34 to pass this signal. An output signal from the second AND-gate 33 is applied as a start signal to a low frequency oscillator 35. The output signal from the second AND-gate 33 is also applied to input 36 of the OR-gate 32 and thence back to the first input 51 of the AND-gate 33, thus maintaining the AND-gate 33 open. The oscillator 35 is conveniently in the form of an astable multi-vibrator, which provides a square wave output signal indicated diagrammatically at 37, feeds the spray guns 13, 14 through power amplifiers 38, 39 respectively.

Thus, when in operation, the arrival of a dough piece is detected at time $Ta$ by the photocell 18 and a delayed pulse is passed by the AND-gate 33 after a time delay T1 so that the spray guns 13, 14 do not commence operating until time $Ta+T1$, i.e. until the leading edge of the dough piece is approximately at the trailing edge of the spray cones 15, 16. When the trailing edge 22 of a dough piece passes across the line between the exciter lamp 17 and the photocell 18 at time $Tb$, the signal from the photocell 18 ceases and the absence of an output signal from the shaper 19 closes the first AND-gate 31. The trailing edge of the output signal from the second AND-gate 33 applied to its and the resultant signal is applied to one input 41 of a third AND-gate 42, which has been preconditioned by an output signal from the second AND-gate 33 applied to its second input 43, and so passes to a second delay unit 44. This delay unit 44 is substantially the same as the delay unit 24 and comprises a third monostable multi-vibrator 45 which is triggered by the signal from the AND-gate 42 and resets after a time delay T2. This time delay T2 corresponds to the time taken for the trailing edge of a dough piece to reach the near edges 46, 47 of the spray cones, 15, 16 after having crossed the line between the exciter lamp 17 and the photocell 18. When the multi-vibrator 45 resets, it triggers a fourth monostable multi-vibrator 48 which provides an output pulse 49. The pulse 49 is inverted by NOT 50 and is applied to the input 34 of the second AND-gate 33 to close that gate. The output signal from the AND-gate 33 is no longer present and the oscillator 35 ceases, thereby stopping operation of the spray guns 13, 14 at time $Tb+T2$, Moreover the output signal from the second AND-gate 33 is no longer applied to its input 51 and the AND-gate 33 closes. The third AND-gate 42 is also closed. The pulse 49 is of short duration and is only applied in its inverted form to the input 34 of the second AND-gate 33. After the end of the pulse 49 the second AND-gate 33 is reconditioned by its input 34 preparatory to receiving a start signal corresponding to the arrival of a subsequent dough piece.

The reset periods of the multi-vibrators 24 and 25 are adjustable by controls 27, 52 respectively so that they can be varied in accordance with any variations effected in the speed of travel of the conveyor 10 or of the relative positioning of the spray guns 13, 14 with respect to the position of the exciter lamp 17 and the photocell 18. The frequency of operation of the oscillator 35 is also adjustable by the control 53 for the purpose of adjusting the rate of discharge of the oil. The spray guns 13, 14 in conventional form are normally provided with detachable containers to receive a liquid to be sprayed and whilst such containers can be utilized for relatively small runs, it is more satisfactory to remove the containers and connect the suction inlets of the pumps in the sprays guns to a larger external source of oil wherefrom the oil may be conveyed under gravity or, if desired, under pressure.

It will be noted that the output signal from the shaper 19, as well as the output pulse from the delay unit 24 are both applied to the first AND-gate 31 so that a delayed output pulse from the delay unit 24 will only be passed to the OR-gate 32 provided that an output signal from the shaper 19 is simultaneously present. This is primarily in order to avoid momentary interruptions of the beam of light from the exciter lamp 17 on to the photocell 18, such as might be occasioned by the passage of a small random dough piece, from bringing about the operation of the spray guns; the discharge of oil in the absence of a dough piece to receive it would not only be wasteful but would also result in undesired and unnecessary accumulation of oil on the conveyor.

A manually operable control 54 is associated with the low frequency oscillator 35 and is actuable in order to cause the oscillator 35 to operate independently of signals from the shaper 19 and at a higher frequency when operation of the spray gun pumps is required for priming the guns, for example after an oil supply has been replaced or changed. Preferably a small drip tray is attached to each of the spray guns just below the nozzle to collect and save any oil which might drip therefrom.

A circuit diagram of one form of adjustable delayed pulse generator suitable for use as a delay unit 24 or 44 in FIG. 1 is illustrated in FIG. 2 and a circuit diagram of one form of square wave generator for use as the oscillator 35 in FIG. 1 is illustrated in FIG. 3.

In the schematic diagram of FIG. 1, purely for the sake of simplicity of illustration the input signals and the output signals are shown as positive-going, but it will be apparent that such signals could equally well be negative-going. FIGS. 2 and 3 show circuit diagrams of a delayed pulse generator and a square wave generator embodying PNP-type transistors for which negative-going signals are appropriate. If these generators embody NPN-type transistors positive-going signals would be appropriate.

Referring to the circuit diagram of FIG. 2, transistors T10 and T11 are connected as a monostable multi-vibrator 25 or 45. The emitters of both the transistors are connected to earth, the base of the transistor T11 is connected to the collector of the transistor T10 through parallel connected capacitor C1 and resistor R1 and to a positive supply through resistor R6. The collector of transistor T11 is connected to the base of the transistor T10 through capacitor C2 and the base of transistor T10 is connected to a negative supply through resistor R2 and a variable resistor R3. The base of the transistor T10 is connected through a diode D1 to a secondary winding 60 of an input transformer TR1 which is shunted by a diode D2 so that only positive pulses can be applied to the base. An input trigger pulse is applied through capacitor C3 to primary winding 61 of the transformer TR1. One end of both primary and secondary windings 60 and 61 are connected to earth and the primary winding is shunted by a diode D3 so that only negative going pulses are applied to the primary winding. Should the input pulse be positive going the connections to the primary winding of the transformer TR1 and to the diode D3 are reversed. Under normal conditions transistor T10 is conducting and when a positive going input pulse is induced in the secondary winding of transformer TR1, transistors T11 and T10 switch states and transistor T11 conducts. After a time determined primarily by capacitor C2 and resistors R2, R3, the transistors are reset. A second pair of transistors T12, T13 are connected as a monostable multivibrator 26, 48, and have their emitters connected to earth; the base of transistor T13 is connected to the collector of transistor T12 through parallel connected capacitor C4 and resistor R4 and to a positive supply through resistor R7, whilst the base of the transistor T12 is connected to the collector of transistor T13 through capacitor C5, and also to a negative supply through resistor R5. The base of transistor T12 is connected through diode D4 and capacitor C6 to the collector of transistor T10 so that when the transistors T10 and T11 reset, a positive pulse is applied to the base of transistor T12 which is normally conducting. The transistors T12 and T13 now switch states and transistor T13 conducts. The transistors T12, T13 are reset after a time delay determined primarily by capacitor C5 and resistor R5. A signal from the collector of transistor T12 is applied to the base of transistor T14 connected as an emitter follower, so that when the multi-vibrator formed by transistors T12 and T13 is triggered, a negative going pulse, whose width is dependent upon the reset time of the transistors T12 and T13, can be withdrawn at 62 from the emitter of the transistor T14.

A suitable form of square wave generator for use as the oscillator 35 in FIG. 1 is illustrated in FIG. 3. The two transistors T20, T21, are connected as an astable multi-vibrator. The emitters of the transistors T20, T21 are connected together to earth through transistor T22 which acts as a switch controlling operation of the transistors T20 and T21. The base of transistor T20 is connected to the collector of the transistor T21 through capacitor C20, to earth through a diode D20 and to a negative supply through resistor R20 and variable resistor R21 whilst the base of transistor T21 is connected to the collector of transistor T20 through capacitor C21, to earth through diode D21, and to a negative supply through resistor R22 and variable resistor R23. The variable resistors R21 and R23 are ganged together and serve to control the frequency of oscillation of the transistors T20 and T21. An input signal on line 70 is applied to the base of transistor T23 whose emitter is connetced to earth through a resistor R24, to the base of transistor T22 through resistor R25 and also to the base of transistor T21 through a capacitor C22. The base of transistor T22 is connected to a positive supply through resistor R26 whilst the collector of transistor T23 is connected directly to a negative supply. On receipt of a negative signal on input lead 70, transistor T23 conducts and a negative signal is applied to the base of transistor T21 through capacitor C22 and to the base of the transistor T22 which then conducts to permit operation of the transistors T20 and T21, such operation being triggered by the signal applied through the capacitor C22. A square wave signal is drawn from the collector of the transistor T21 and applied to the base of a transistor T24 which operates as an amplifier. A signal drawn from the collector of the transistor T24 is applied to the base of transistor T25 which similarly functions as an amplifier. Signals appearing at the collector of the transistor T25 are applied to the base of transistor T26 from the emitter of which a first output can be withdrawn on lead 71, and also to the base of a transistor T27 which operates as an inverter. The collector of transistor T27 is connected to the base of transistor T28 from the emitter of which a second output can be withdrawn on lead 72, 180° out of phase to that on lead 71.

Either or both of the transistors T26 and T28 could serve as the power amplifiers 38, 39 of FIG. 1. If both are so used the two spray guns 13, 14 will be operated anti-phase; it is, however, preferred that the two spray guns be operated in phase and both guns are connected between earth and either the output lead 71 or the output lead 72.

In order to enable the square wave generator to operate at a higher frequency to facilitate priming the pumps of the spray guns, and independently of passage of dough pieces, operation of the manually operable control 54 of FIG. 1 can conveniently be arranged firstly through switch MS1 to apply a start signal to lead 70, for example by applying a negative potential thereto, and secondly through switches MS2 and MS3 to short-circuit both resistors R21 and R23.

One form of apparatus for applying oil to dough pieces is illustrated in the perspective view of FIG. 4. Tunnel 80 includes two side members 81, 82 which are suitably adapted for mounting astride conveyor 10. Each side member is apertured as at 83, 84 and carries a pair of outwardly and downwardly projecting brackets 85, 86 for adjustably and fixedly receiving a mounting plate 87, 88 to receive a spray gun 14 or 13. Both side members are additionally apertured as at 89 and one side member carries adjustably a housing for the lamp 17, which is not visible in FIG. 4, and a housing 90 for the photocell 18. Removably surrounding the tunnel 80 is a box or container 91 having a removable lid 92 for housing the control equipment illustrated schematically in FIG. 1; including the delay units 24 and 44, the low frequency oscillator 35, AND-gates 31, 33 and 42, NOT 40 and 50, and OR-gate 32. One end of the box 91 carries a control panel 93 on which are mounted a main switch 94, the priming control 54, a pilot light 95 for indicating when power is supplied to the apparatus; a second pilot light 96 for indicating when the spray guns are operating. The adjustable resistors 27, 52 and 53 are preferably preset and the lid 92 is provided with a removable panel 97 for access thereto. In order to cater for different sizes of dough pieces the variable resistors 53 are duplicated and a selector switch 98 provided on the control panel 93 for selecting either of two preset frequencies of operation of the low frequency oscillator 35, together with pilot lights 99, 100 for providing visual indication of which frequency has been selected. Each spray gun is connected to the control equipment by a plug and socket connection such as 101 and the lamp 17 and the photocell 18 similarly by plug and socket connections such as 102, so that either spray gun, or the lamp or the photocell or the control equipment can be detached independently for service and maintenance or replacement.

In operation it has been found that using the type of airless spray gun known by the trade name "Mistral C" for dispensing small quantities of oil, for example less than 0.01 oz. per nominal 1 lb. dough piece, a frequency in the range of from two to ten cycles per second is satisfactory. Whilst in the embodiment described the airless spray guns are those known by the trade name "Mistral C" it is to be understood that the invention is not limited to the use of such spray guns and that any other form of airless spray gun embodying an electrically operated pump unit may be employed.

Though the time delays T1 and T2 can be fixed arbitrarily by manual adjustment of the controls 27, 52, which correspond to the resistor R3 in the circuit diagram of FIG. 2 for a predetermined speed of the conveyor 10, it will be readily apparent that these controls may be related directly to the speed of the conveyor either by incorporating a tachometric generator and servo system responsive thereto or by any other form of speed responsive control device.

In operation it will be appreciated that directly the leading edge of a dough piece crosses the line between the exciter lamp 17 and photocell 18, the sequence of operations leading to the start of the oscillator 35 is commenced but that the discharge of oil from the spray guns 13 and 14 will not commence for a short time until the leading edge is effectively at the far edges 28, 29 of the spray cones 15 and 16. The operation of the spray guns will continue until a short time after the trailing edge of a dough piece has been detected by the photocell 18. This trailing edge need not essentially be the trailing edge of the same dough piece that initiated operation of the spray guns and it is quite possible for several dough pieces to be disposed one behind another with the front of one dough piece touching the rear of another, and spraying will continue until the trailing edge of the last dough piece has been detected. When such trailing edge is detected operation of the spray guns will continue for a short time until the trailing edge is effectively at the near edges 46, 47 of the spray cones 15, 16. Directly the leading edge of a further dough piece is detected the sequence of operations will follow once more. It is, therefore, not essential that the dough pieces should be uniformly spaced on the conveyor 10 as the apparatus will respond to each individual dough piece or will treat a succession of dough pieces abutting one another effectively as a single dough piece. The length of time for which the oscillator 35 operates is directly related to the length of the dough piece, since the signals which both start it and stop it depend upon detection of the leading and trailing edges of the dough piece; dough pieces can, therefore, be of any convenient length.

I claim:

1. Apparatus for applying oil to dough pieces moving along a given path comprising in combination, at least one airless spray gun for discharging oil in a spray cone to contact the dough pieces, an electromagnetically operated pump unit in said spray gun, and a low frequency oscillator for energizing the spray gun pump unit, said oscillator being operable at a frequency in the range of two to ten cycles per second whereby a small quantity of oil will be applied to the dough pieces.

2. Apparatus according to claim 1, in which said low-frequency oscillator is an astable multi-vibrator.

3. Apparatus according to claim 1 including a conveyor carrying dough pieces along said given path, and a pair of said spray guns one on either side of and both a little above said conveyor.

4. Apparatus according to claim 1 further including sensing means for determining the presence of the leading and trailing edges of each dough piece to sense the length of each dough piece, and control means responsive to said sensing means to render said oscillator operable to cause oil to be discriminately applied to the dough pieces in accordance with their length whereby oil will be applied to the dough pieces only when they are positioned substantially within the spray cone of the spray gun.

5. Apparatus according to claim 4 in which said control means comprises sensing means at a sensing station in advance of the position of the spray guns along the conveyor to provide a first signal when the leading edge of a dough piece arrives at the sensing station and a second signal when the trailing edge of a dough piece leaves it, a first delay unit responsive to a first signal from the sensing means and arranged to provide a starting signal for the oscillator after a predetermined time delay such that the leading edge of the dough piece has reached approximately the far edges of the spray cones from the spray guns, and a second delay unit responsive to a second signal from the sensing means and arranged to provide a stopping signal for the oscillator after a second predetermined time delay such that the trailing edge of a dough piece has reached approximately the inner edges of the spray cones of the spray guns.

6. Apparatus according to claim 5 in which the sensing means comprise a light source and a photo-sensitive element.

7. Apparatus according to claim 5 including a shaper, and each of said delay units comprises a monostable multi-vibrator which is triggered by a signal from the shaper providing square wave output signals in response to signals from the photosensitive element and which, on resetting, triggers a second monostable multi-vibrator to provide an output pulse of predetermined width.

8. Apparatus according to claim 1 including a manually operable start switch associated with said oscillator and in which said oscillator is adapted to operate at a higher frequency in response to operation of said start switch.

9. An apparatus having means for moving dough pieces along a given path and means for applying oil to the dough pieces including in combination, at least one airless spray gun having an electromagnetically operated pump unit arranged to spray oil over a length of said path upon operation of said pump unit, a control system including a variable low frequency oscillator operable in the frequency range of 2 to 10 cycles per second for energizing the pump unit of the spray gun to apply oil to the dough pieces as they are moved along said path, and control means responsive to the presence of a dough piece for controlling the starting and stopping of said oscillator whereby oil is applied only while a dough piece occupies said length of said path.

10. A system according to claim 9 in which the low frequency oscillator is an astable multi-vibrator.

11. A system according to claim 9 for use with apparatus in which there is provided a conveyor for carrying dough pieces, in which the control means comprises sensing means at a sensing station in advance of the position of the spray guns along the conveyor to provide a first signal when the leading edge of a dough piece arrives at the sensing station and a second signal when the trailing edge of a dough piece leaves it, a first delay unit responsive to a first signal from the sensing means and arranged to provide a starting signal for the oscillator after a predetermined time delay such that the leading edge of the dough piece has reached approximately the far edges of the spray cones from the spray guns, and a second delay unit responsive to a second signal from the sensing means and arranged to provide a stopping signal for the oscillator after a second predetermined time delay such that the trailing edge of a dough piece has reached approximately the inner edges of the spray cones of the spray guns.

12. A system according to claim 11 in which each of said delay units comprises a monostable multi-vibrator which is triggered by a signal from a shaper providing square wave output signals in response to signals from the photosensitive element and which, on resetting, triggers a second monostable multi-vibrator to provide an output pulse of predetermined width.

13. A system according to claim 9, including a manually operable start switch associated with said oscillator and in which said oscillator is adapted to operate at a higher frequency in response to operation of said start switch.

14. In apparatus for moving dough pieces along a given path, means for applying oil to the dough pieces as they are moved along the path, said means comprising in combination; a spray gun located adjacent the path to spray oil in a conical distribution pattern to contact dough pieces moving along the path, actuating means for operating the spray gun, a sensing station situated along the path at a location before said spray gun, and control means for energizing said actuating means to cause the gun to spray oil on a dough piece at a predetermined time interval after the leading edge of the dough piece reaches the sensing station and for deenergizing said actuating means to stop the spray of oil on the dough piece at a predetermined time interval after the trailing edge of the dough piece leaves said sensing station whereby the spray gun is operable to spray oil on a dough piece only when the dough piece is positioned substantially within the spraying cone of the spray gun, said control means including sensing means at said sensing station for providing a first signal when the leading edge of the dough piece arrives at the sensing station and a second signal when the trailing edge of the dough piece leaves said sensing station a first delay means responsive to a first signal from the sensing means and arranged to provide a starting signal for the actuating means after a predetermined time delay such that the leading edge of the dough piece has reached approximately the far edges of the spray cones from the spray gun, and a second delay means responsive to a second signal from the sensing means and arranged to provide a stopping signal for said actuating means after a second predetermined time delay such that the trailing edge of the dough piece has reached approximately the inner edges of the spray cones of the spray gun.

References Cited

UNITED STATES PATENTS

| | | | |
|---|---|---|---|
| 2,763,575 | 9/1956 | Bede | 118—376 X |
| 2,961,990 | 11/1960 | Wruck | 118—2 |
| 3,039,696 | 6/1962 | Point et al. | 239— 102 X |
| 3,121,534 | 2/1964 | Wilson | 239—102 |
| 3,090,350 | 5/1963 | Walters | 118—2 |
| 3,103,310 | 9/1963 | Lang | 239—4 |
| 3,243,122 | 3/1966 | Snaper | 239—4 X |
| 3,309,605 | 3/1967 | Hoven | 331—113 X |
| 3,356,061 | 12/1967 | Wiggins | 118—2 |
| 3,390,835 | 7/1968 | Harris | 239—102 X |

WALTER A. SCHEEL, Primary Examiner

J. P. McINTOSH, Assistant Examiner

U.S. Cl. X.R.

118—316, 324; 239—102